(12) United States Patent
Mitani et al.

(10) Patent No.: US 10,000,240 B2
(45) Date of Patent: Jun. 19, 2018

(54) VEHICLE HIGH VOLTAGE EQUIPMENT MOUNTING FOR REAR-END COLLISIONS

(71) Applicant: HONDA MOTOR CO., LTD., Tokyo (JP)

(72) Inventors: Manabu Mitani, Wako (JP); Koichi Takahashi, Wako (JP); Kazuya Nakano, Wako (JP); Sachiko Katsuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/298,232

(22) Filed: Oct. 20, 2016

(65) Prior Publication Data

US 2017/0106910 A1    Apr. 20, 2017

(30) Foreign Application Priority Data

Oct. 20, 2015    (JP) .................. 2015-206584

(51) Int. Cl.
*B60K 5/00*    (2006.01)
*B62D 21/15*    (2006.01)
(Continued)

(52) U.S. Cl.
CPC .............. *B62D 21/152* (2013.01); *B60K 1/04* (2013.01); *B60K 6/40* (2013.01); *B62D 21/03* (2013.01);
(Continued)

(58) Field of Classification Search
CPC ...... B62D 21/152; B62D 21/03; B62D 21/00; B62D 21/15; B60K 6/40; B60K 6/405; B60K 6/28; B60K 6/22; B60K 1/04; B60K 1/00; B60K 2001/0416; B60K 2001/005; B60K 2001/0422; B60K 2001/0427;
(Continued)

(56) References Cited

U.S. PATENT DOCUMENTS 3,190,387 A * 6/1965 Dow ..................... B60K 1/00
180/65.1
3,902,565 A * 9/1975 Farrall .................. B60K 1/00
180/65.1
(Continued)

FOREIGN PATENT DOCUMENTS

JP        4200014 B2    7/2003
JP        3571704 B2    10/2003
JP      2005-112284     4/2005

*Primary Examiner* — James M Dolak
(74) *Attorney, Agent, or Firm* — Mori & Ward, LLP

(57) ABSTRACT

A vehicle includes an engine, a seat, an upper member, a lower member, and a high voltage equipment. The engine is provided at a rear in a front-rear direction of the vehicle. The seat is provided in front of the engine in the front-rear direction. The upper member is provided between the seat and the engine in the front-rear direction and extends in a vehicle width direction of the vehicle perpendicular to the front-rear direction. The lower member extends in the vehicle width direction and is provided between the seat and the engine below the upper member in a vehicle height direction of the vehicle perpendicular to the front-rear direction and the vehicle width direction. The high voltage equipment is provided between the seat and the engine and in a space surrounded by the upper member and the lower member.

14 Claims, 8 Drawing Sheets

(51) Int. Cl.
    *B60K 1/04*    (2006.01)
    *B60K 6/40*    (2007.10)
    *B62D 21/03*   (2006.01)

(52) U.S. Cl.
    CPC ... *B60K 2001/0416* (2013.01); *B60Y 2200/92* (2013.01); *B60Y 2306/01* (2013.01); *Y10S 903/951* (2013.01)

(58) Field of Classification Search
    CPC .............. B60K 2001/0433; B60K 5/12; B60K 5/1291; B60K 5/08; B60K 5/1216; B60K 2005/003; B60K 2005/006
    See application file for complete search history.

(56) References Cited

U.S. PATENT DOCUMENTS

| | | | | |
|---|---|---|---|---|
| 7,503,585 B2* | 3/2009 | Hashimura | .......... | B60K 15/063 280/124.109 |
| 7,789,454 B2* | 9/2010 | Kim | .......... | B60K 1/04 296/184.1 |
| 7,886,861 B2* | 2/2011 | Nozaki | .......... | B60K 1/00 180/232 |
| 8,584,779 B2* | 11/2013 | Tsuchiya | .......... | B60K 1/04 180/68.5 |
| 8,708,401 B2* | 4/2014 | Lee | .......... | B62D 21/152 280/124.109 |
| 8,714,616 B2* | 5/2014 | Minami | .......... | B60K 1/04 296/37.16 |
| 8,739,911 B2* | 6/2014 | Katou | .......... | B60K 1/04 180/68.5 |
| 8,919,865 B2* | 12/2014 | Ogawa | .......... | B62D 25/087 296/187.11 |
| 9,174,520 B2* | 11/2015 | Katayama | .......... | B60K 1/04 |
| 9,308,805 B2* | 4/2016 | Shiromura | .......... | B60K 1/04 |
| 9,561,823 B2* | 2/2017 | Eberle | .......... | B62D 21/152 |
| 9,828,031 B2* | 11/2017 | Langhoff | .......... | B62D 21/152 |
| 9,861,018 B2* | 1/2018 | Seki | .......... | B60L 1/003 |

* cited by examiner

VEHICLE HIGH VOLTAGE EQUIPMENT MOUNTING FOR REAR-END COLLISIONS

CROSS-REFERENCE TO RELATED APPLICATIONS

The present application claims priority under 35 U. S. C. § 119 to Japanese Patent Application No. 2015-206584, filed Oct. 20, 2015. The contents of this application are incorporated herein by reference in their entirety.

BACKGROUND

1. Field

The present invention relates to a vehicle.

2. Description of the Related Art

High voltage equipment including a battery (high voltage battery), a DC-DC converter, and an inverter is installed in vehicles such as an electric vehicle and a hybrid vehicle. For example, Japanese Patent Application Publication No. 2005-112284 and Japanese Patent No. 3571704 disclose vehicles in which high voltage equipment is arranged by utilizing space behind a seat.

A sports vehicle having an engine mounted in a rear part of the vehicle body has also been known (see Japanese Patent No. 4200014, for example). Although in recent years' hybridization of this type of vehicle has also been proposed, space for arranging high voltage equipment needs to be ensured for hybridization.

SUMMARY

According to one aspect of the present invention, a vehicle in which high voltage equipment is arranged behind a seat and in front of an engine, includes an upper member and a lower member. The upper member is arranged in an upper part between the seat and the engine, and extending in the vehicle width direction. The lower member is arranged in a lower part between the seat and the engine, and extending in the vehicle width direction. The high voltage equipment is arranged in a space surrounded by the upper member and the lower member.

According to another aspect of the present invention, a vehicle includes an engine, a seat, an upper member, a lower member, and a high voltage equipment. The engine is provided at a rear in a front-rear direction of the vehicle. The seat is provided in front of the engine in the front-rear direction. The upper member is provided between the seat and the engine in the front-rear direction and extends in a vehicle width direction of the vehicle perpendicular to the front-rear direction. The lower member extends in the vehicle width direction and is provided between the seat and the engine below the upper member in a vehicle height direction of the vehicle perpendicular to the front-rear direction and the vehicle width direction. The high voltage equipment is provided between the seat and the engine and in a space surrounded by the upper member and the lower member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
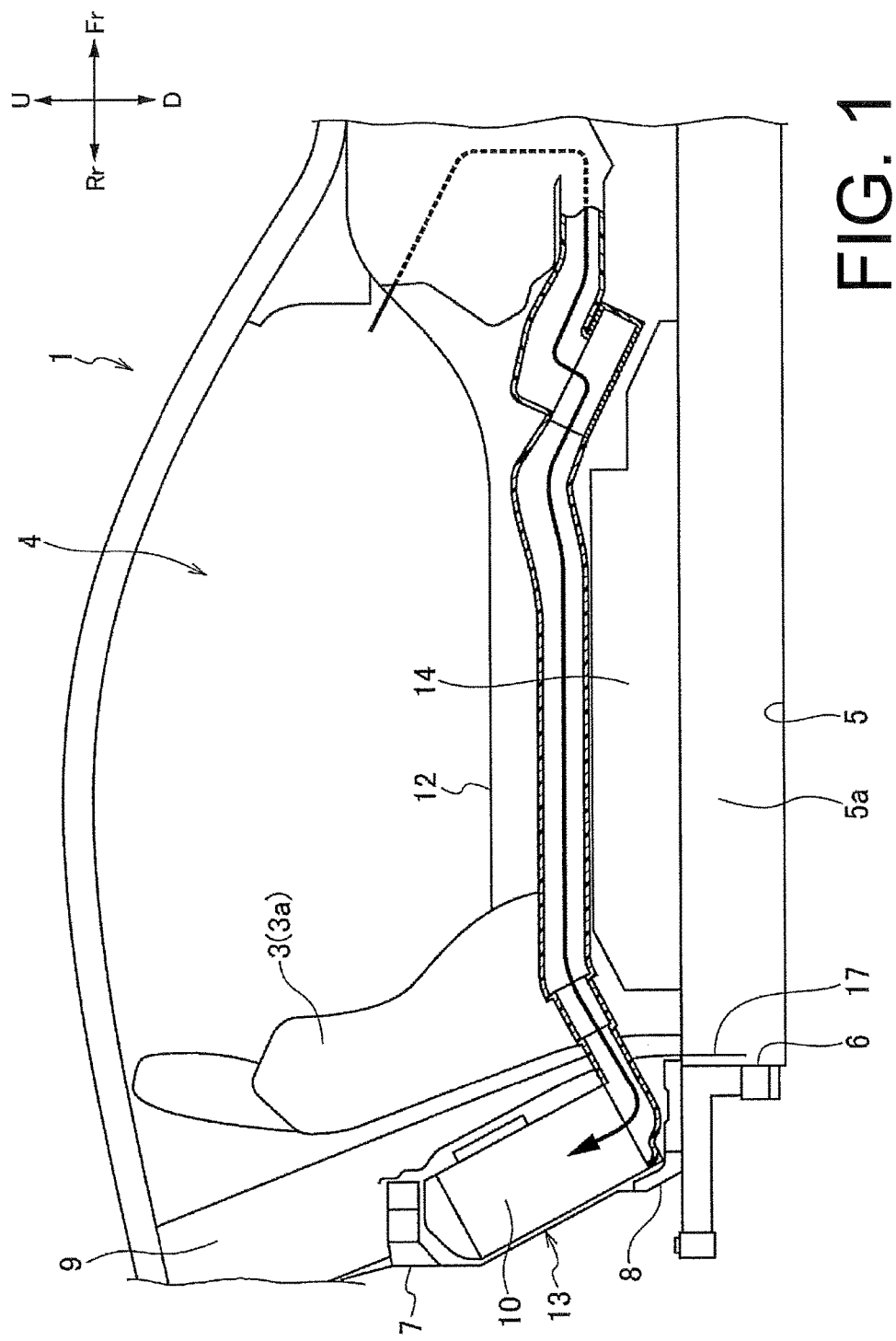
FIG. 1 is a schematic right side view of the interior of a vehicle according to an embodiment of the present invention.

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

[Vehicle]

Figure 2:
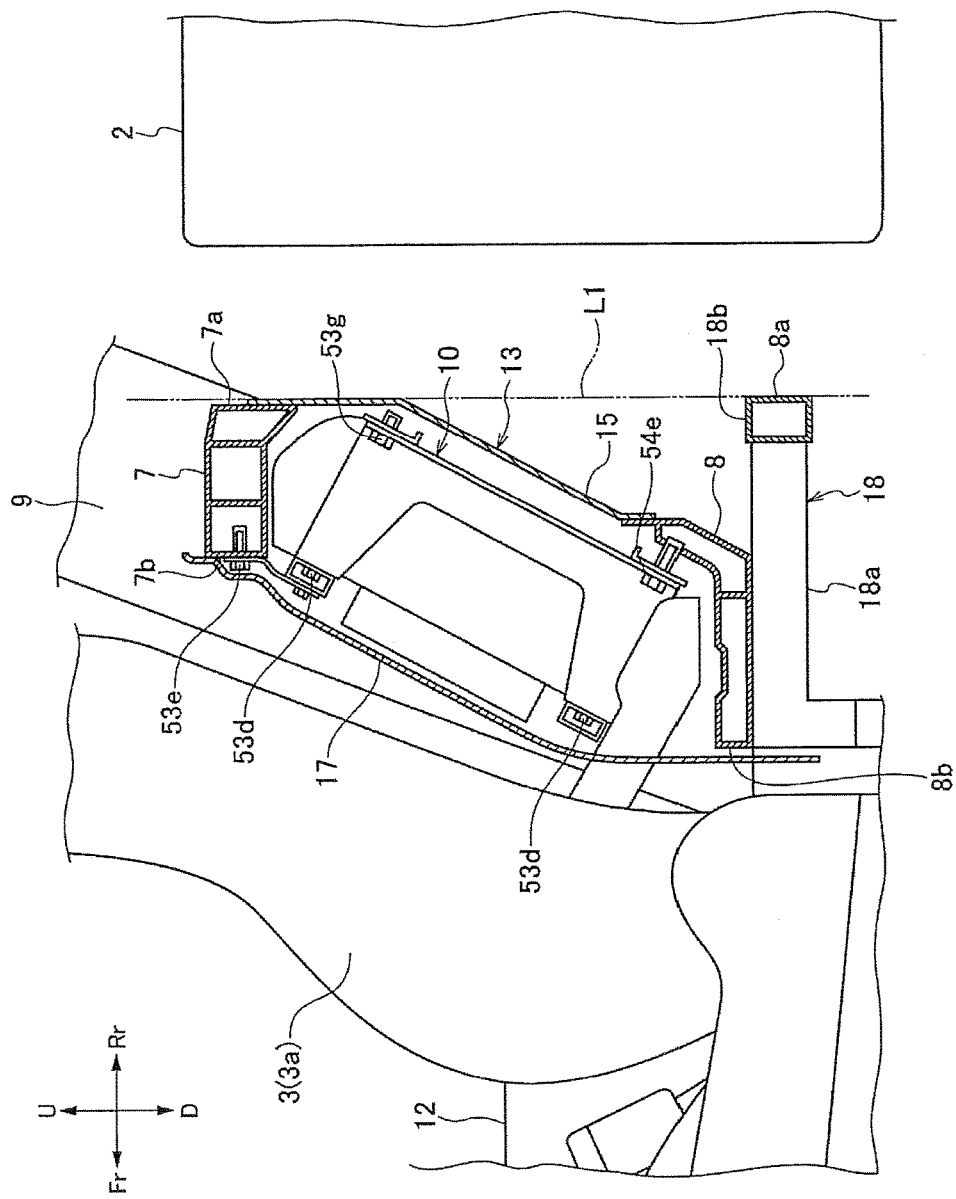
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle inside 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-Accommodation Portion]

Figure 3:
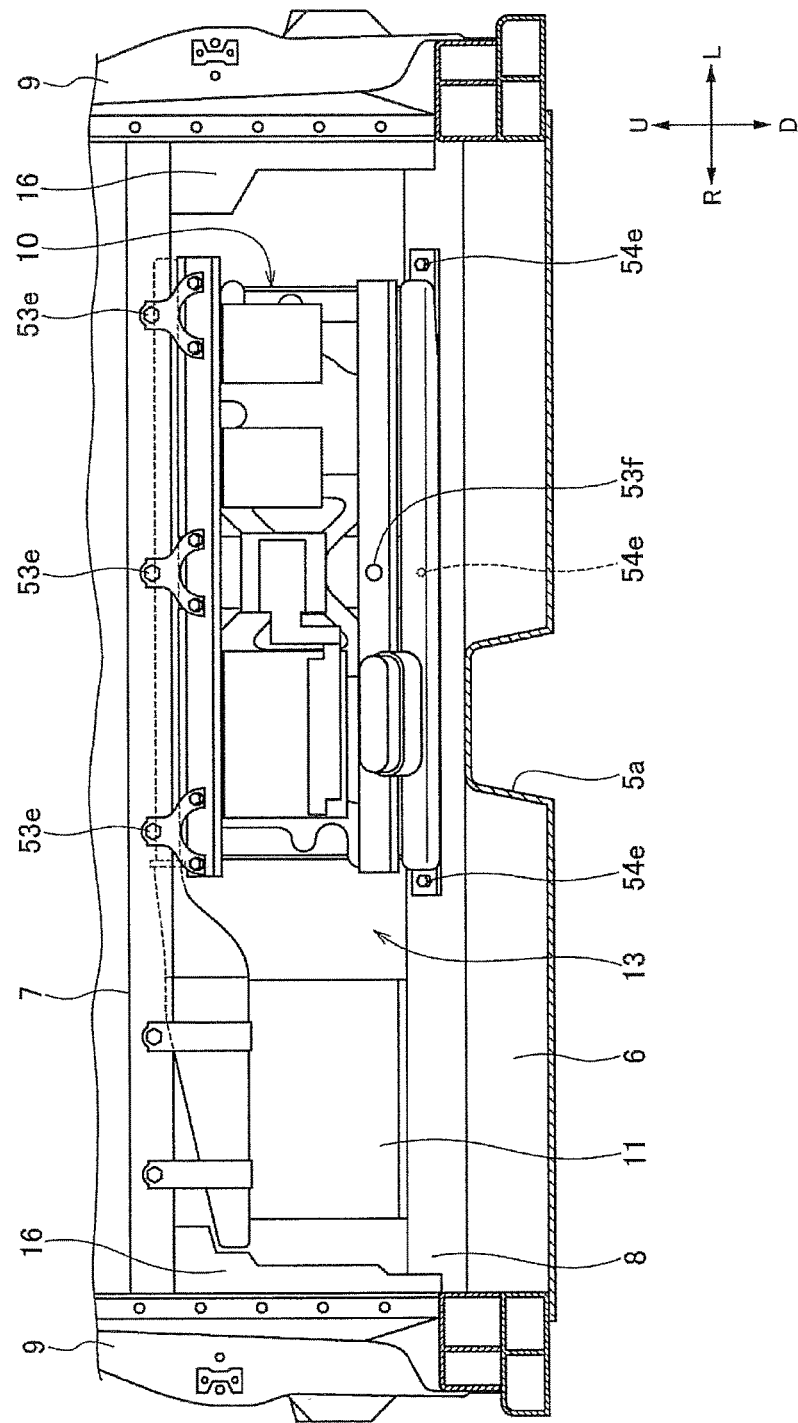
FIG. 3 is a front view of a high voltage equipment-accommodation portion in which a battery unit is arranged.
Figure 7:
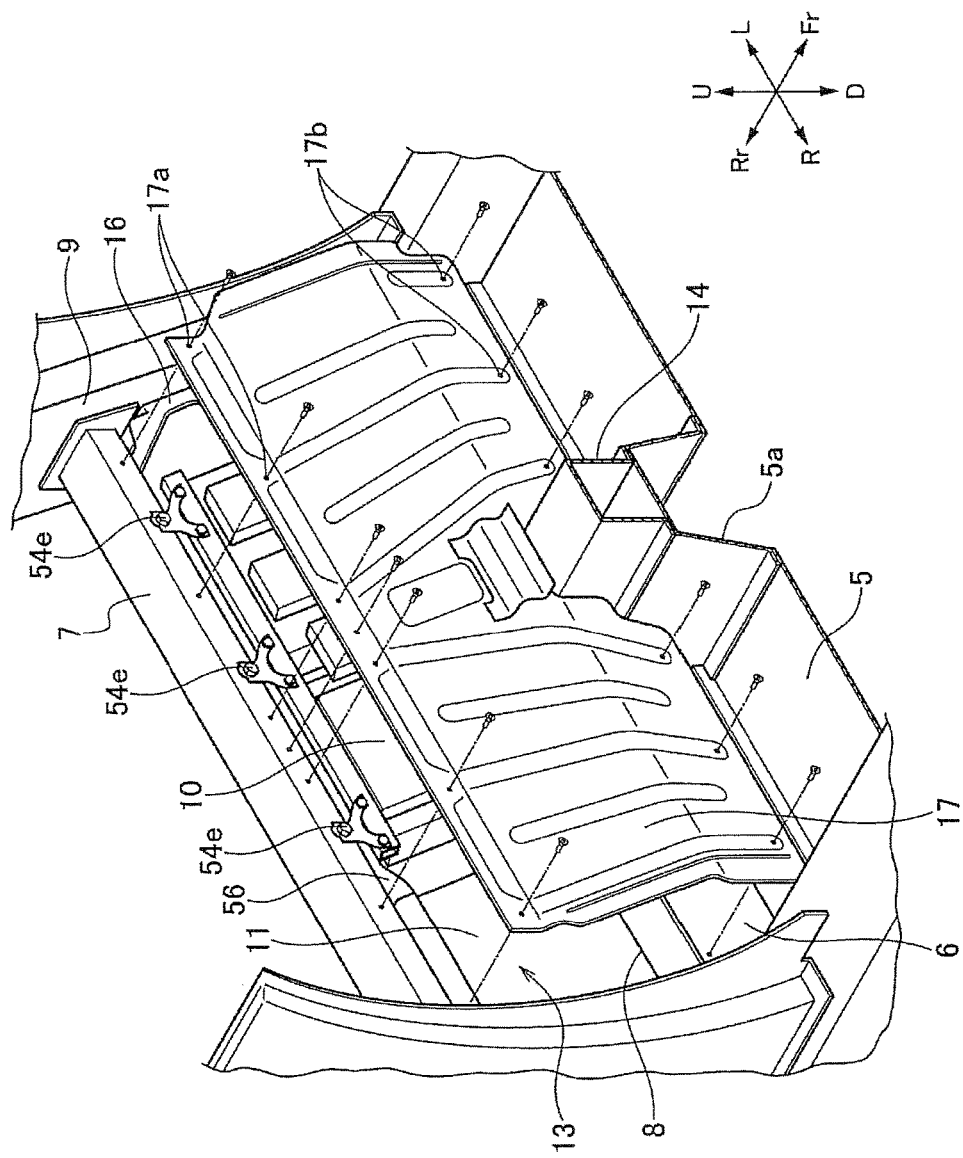
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8. Note that details of the high voltage equipment-protection cover 17 will be described later.

[High Voltage Equipment]

The vehicle 1 is provided with the battery unit 10 consisting of a high voltage battery, as high voltage equipment. As mentioned above, the battery unit 10, together with the DC-DC converter 11 which is also high voltage equipment, is accommodated in the high voltage equipment-accommodation portion 13 provided behind the seats 3.

Figure 4:
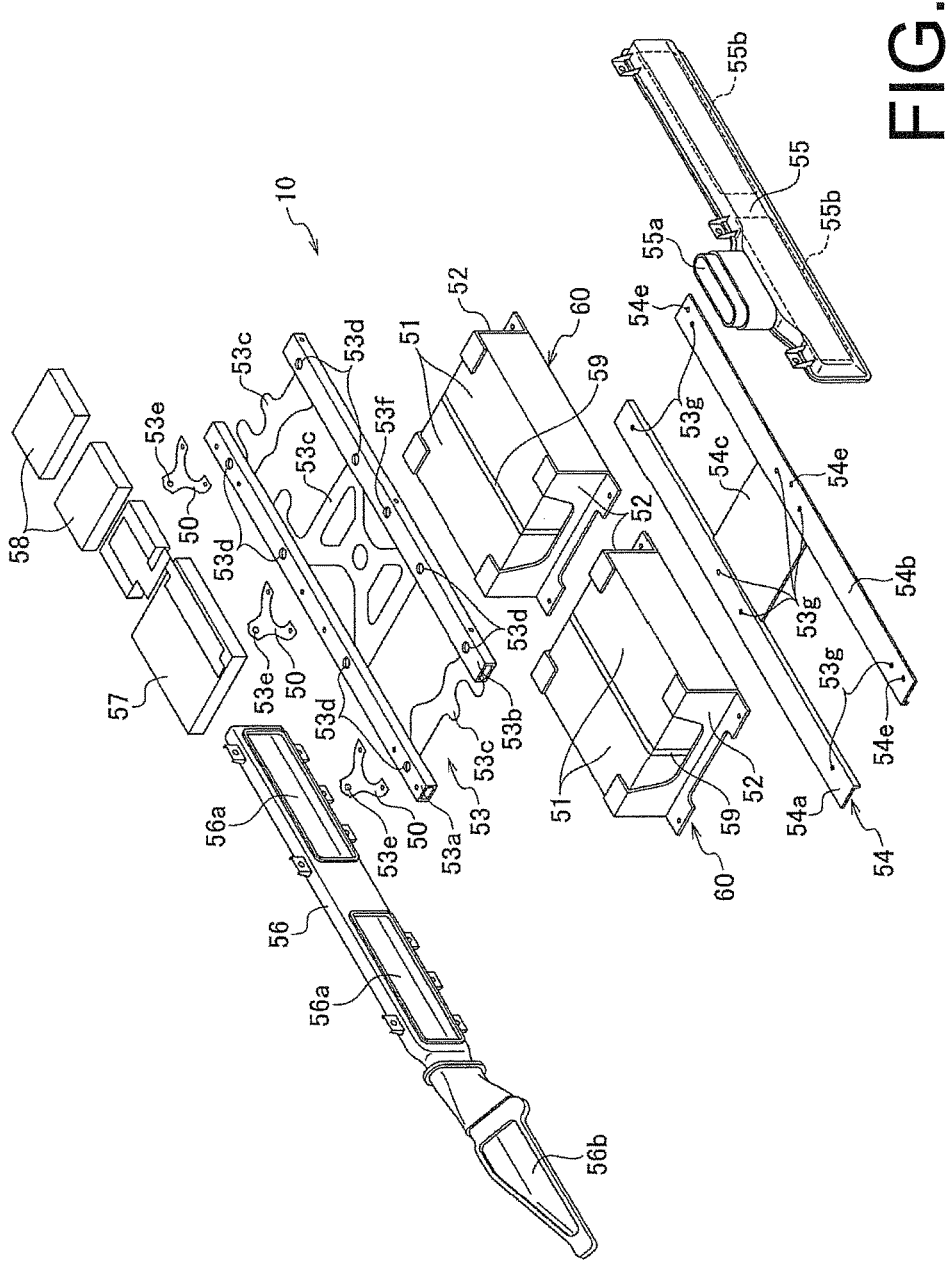
FIG. 4 is an exploded perspective view of the battery unit.
Figure 5:
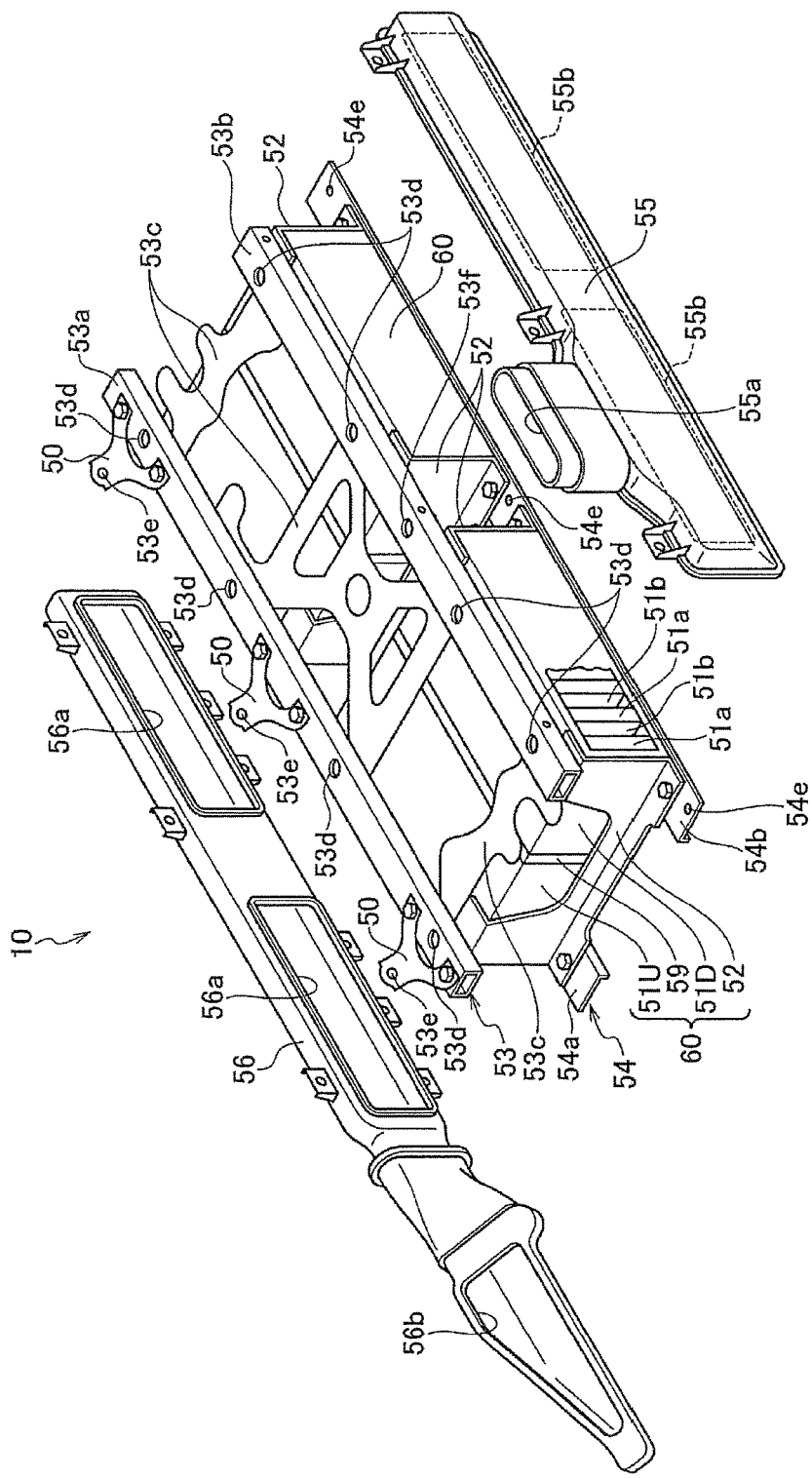
FIG. 5 is an exploded perspective view of the battery unit in which only ducts are disassembled.
Figure 6:
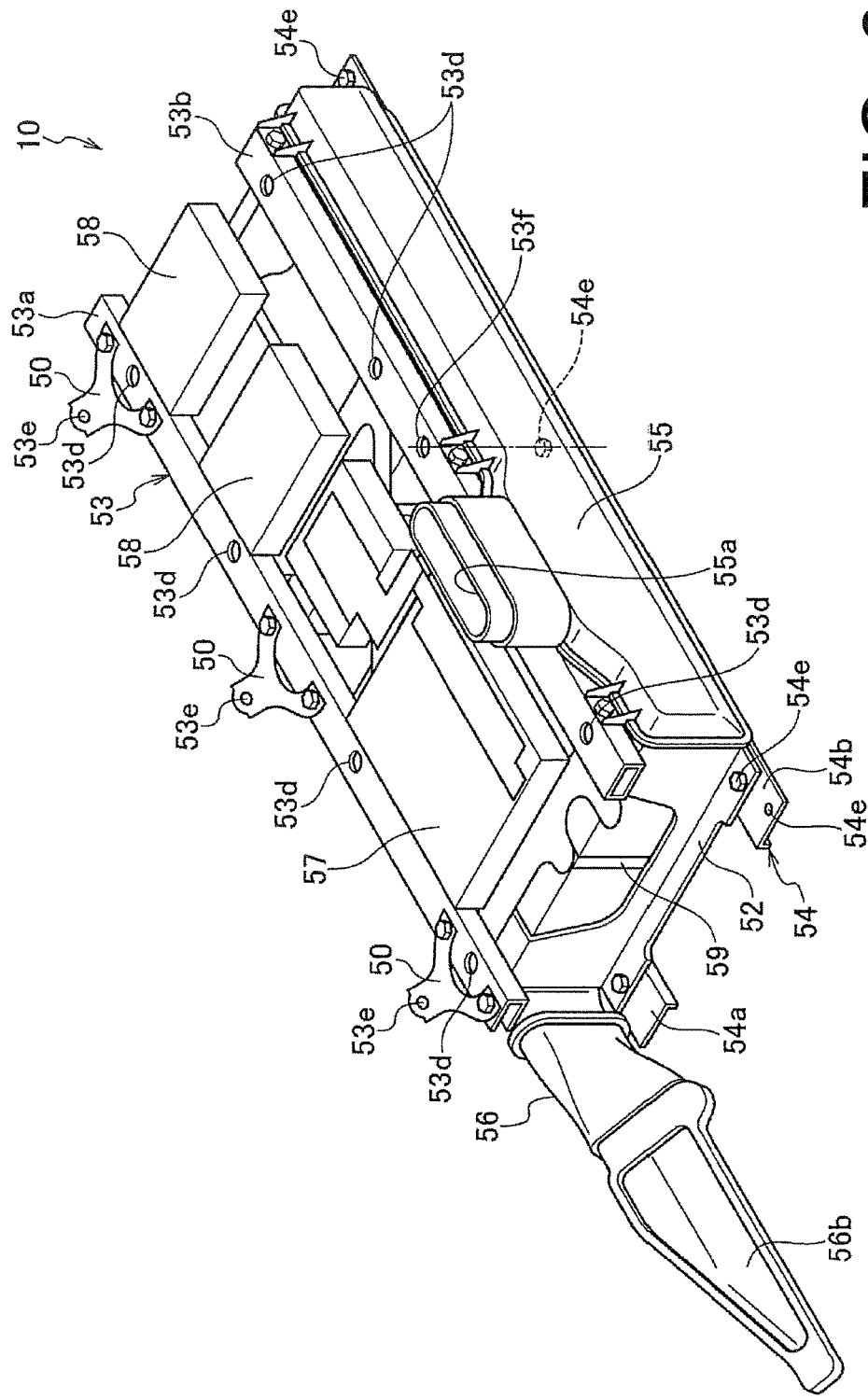
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 that prevents leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D. Note that in the embodiment, cooling air having passed through an air conditioning system of the vehicle 1 is transmitted to the inlet duct 55 of the battery unit 10, through a supply duct provided inside the center console 12.

The exhaust duct 56 includes: two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points 53e of the front frame 53 are fastened to the upper member 7 with bolts, and the lower fastening points 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8.

As mentioned above, the battery unit 10 accommodated in the high voltage equipment-accommodation portion 13 provided behind the seat 3 is tilted rearward along the back 3a of the seat 3 in side view, while its upper part is fastened to the upper member 7 through multiple upper fastening points 53e, and its lower part is fastened to the lower member 8 through multiple lower fastening points 54e. Accordingly, the upper member 7 and the lower member 8 support the battery unit 10 at both ends in the vertical direction.

[Structure for Prevention of Damage in High Voltage Equipment at the Time of a Rear-End Collision]

Next, a structure for prevention of damage in the battery unit 10 and the DC-DC converter 11 at the time of a rear-end collision will be described, with reference to FIGS. 2 and 8.

As shown in FIG. 2, in the vehicle 1, the battery unit 10 and the DC-DC converter 11 are arranged behind the seats 3 and in front of the engine 2. Hence, if the engine 2 and the seats 3 protrude into the arrangement space of the battery unit 10 and the DC-DC converter 11 at the time of a rear-end collision, the battery unit 10 and the DC-DC converter 11 may be damaged.

Hence, in the vehicle 1 according to the embodiment of the present invention, the battery unit 10 and the DC-DC converter 11 are arranged in the high voltage equipment-accommodation portion 13, which is a space surrounded by the upper member 7 and the lower member 8. This prevents protrusion of the engine 2 and the seats 3 into the high voltage equipment-accommodation portion 13, at the time of a rear-end collision. Additionally, the upper member 7 and lower member 8 of the embodiment respectively include engine receiving portions 7a, 8a for receiving a front end part of the engine 2 at the time of a rear-end collision, and seat receiving portions 7b, 8b for receiving a rear part of the seats 3 at the time of a rear-end collision. This allows the upper member and the lower member to securely receive the front end part of the engine 2 and the rear part of the seats 3, at the time of a rear-end collision. Hereinbelow, specific configurations of the engine receiving portions 7a, 8a and the seat receiving portions 7b, 8b will be described.

As shown in FIG. 2, the upper member 7 has a shape longitudinally long and substantially rectangular in side cross-sectional view. The upper fastening points 53e of the battery unit 10 and the fastening points 17a of the high voltage equipment-protection cover 17 are fastened to a front end part of the upper member, while an upper end part of the rear cover 15 is fixed to a rear end part of the upper member. The seat receiving portion 7b of the upper member 7 is a corner between a front end surface and an upper surface of the upper member 7. The seat receiving portion 7b receives a rear surface part of the backs 3a of the seats 3 when the backs 3a fall back at the time of a rear-end collision, and thereby prevents protrusion of the seats into the high voltage equipment-accommodation portion 13. Meanwhile, the engine receiving portion 7a of the upper member 7 is a rear end surface of the upper member 7. The engine receiving portion 7a receives a front end part of the engine 2 when the engine 2 comes close to the high voltage equipment-accommodation portion 13 at the time of a rear-end collision, and thereby prevents protrusion of the engine into the high voltage equipment-accommodation portion 13.

As shown in FIG. 2, the lower member 8 includes, as one body, a part longitudinally long and substantially rectangular in side cross-sectional view, and a part extending from a rear end part of the rectangular part in the rear obliquely upper direction. The fastening points 17b of the high voltage equipment-protection cover 17 are fastened to a front end part of the lower member, while lower fastening points 54e of the battery unit 10 are fastened to the front of a rear end part of the lower member, and also a lower end part of the rear cover 15 is fixed to the rear of the rear end part of the lower member. The seat receiving portion 8b of the lower member 8 is a front end surface of the lower member 8. The seat receiving portion 8b receives a rear surface part of the seats 3 when the seats 3 slide rearward at the time of a rear-end collision, and thereby prevents protrusion of the seats into the high voltage equipment-accommodation portion 13.

Figure 8:
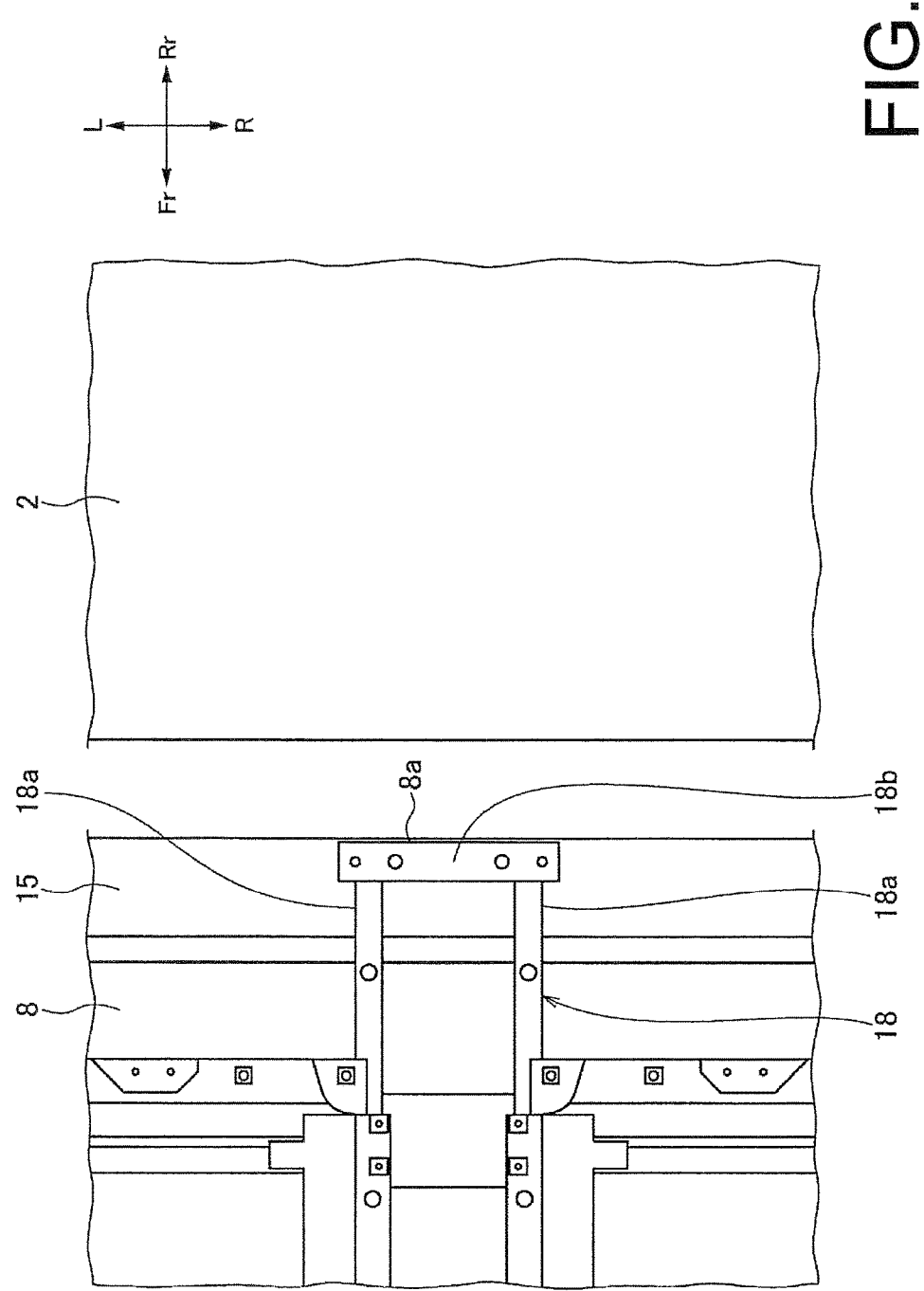
FIG. 8 is a bottom view of a main part of an engine receiving portion of a lower member.

FIG. 8 is a bottom view of a main part of the engine receiving portion 8a of the lower member 8.

As shown in FIGS. 2 and 8, the engine receiving portion 8a of the lower member 8 is a rear end surface of an engine stopper 18 connected and fixed to the lower member 8. The engine receiving portion 8a receives the front end part of the engine 2 when the engine 2 comes close to the high voltage equipment-accommodation portion 13 at the time of a rear-end collision, and thereby prevents protrusion of the engine into the high voltage equipment-accommodation portion 13.

The engine stopper 18 is fixed to a lower surface of the lower member 8, and includes a right and left pair of frame portions 18a extending rearward from the lower member 8, and a stopper portion 18b connecting rear ends of the frame portions 18a with each other. The longitudinal position of a rear end surface of the stopper portion 18b, which is the engine receiving portion 8a of the lower member 8, is set such that a virtual line L1 passing through the rear end surface of the stopper portion 18b and through the rear end surface of the upper member 7, which is the engine receiving portion 7a of the upper member 7, extends along a substantially vertical direction. In other words, the rear end surface of the stopper portion 18b and the rear end surface of the upper member 7 substantially coincide with each other in the longitudinal direction.

According to the above-mentioned structure for prevention of damage in high voltage equipment at the time of a rear-end collision, when the engine 2 comes close to the high voltage equipment-accommodation portion 13 at the time of a rear-end collision, the engine receiving portion 7a of the upper member 7 and the engine receiving portion 8a of the lower member 8 receive the front end part of the engine 2 almost simultaneously, and thereby prevent protrusion of the engine into the high voltage equipment-accommodation portion 13.

Also, when the backs 3a of the seats 3 fall back at the time of a rear-end collision, the seat receiving portion 7b of the upper member 7 receives the rear surface part of the backs 3a, and thereby prevents protrusion of the seats into the high voltage equipment-accommodation portion 13.

Moreover, when the seats 3 slide rearward at the time of a rear-end collision, the seat receiving portion 8b of the lower member 8 receives the rear surface part of the seats 3, and thereby prevents protrusion of the seats into the high voltage equipment-accommodation portion 13.

In addition, when the seats 3 are slid rearward or the backs 3*a* are reclined with luggage sandwiched between the backs 3*a* of the seats 3 and the high voltage equipment-protection cover 17 during normal use, the fallback load or sliding load of the seats 3 acts on the high voltage equipment-protection cover 17 through the luggage. However, since the high voltage equipment-protection cover 17 of the embodiment is fastened to the upper member 7 and the lower member 8, load acting on the high voltage equipment-protection cover 17 can be passed to the upper member 7 and the lower member 8. Accordingly, protrusion of the high voltage equipment-protection cover 17 into the high voltage equipment-accommodation portion 13 can be suppressed.

As has been described, according to the vehicle 1 of the embodiment, even though the battery unit 10 and the DC-DC converter 11 are arranged behind the seats 3 and in front of the engine 2, the battery unit 10 and the DC-DC converter 11 are arranged in a space surrounded by the upper member 7 and the lower member 8. Hence, when the engine 2 and the seats 3 are likely to protrude into the arrangement space of the battery unit 10 and the DC-DC converter 11 at the time of a rear-end collision, the upper member 7 and the lower member 8 can prevent protrusion of the engine 2 and the seats 3, and thereby prevent damage in the battery unit 10 and the DC-DC converter 11.

Also, the upper member 7 and the lower member 8 respectively include the engine receiving portions 7*a*, 8*a*, for receiving the front end part of the engine 2 at the time of a rear-end collision. Hence, when the engine 2 is likely to protrude into the arrangement space of the battery unit 10 and the DC-DC converter 11 at the time of a rear-end collision, the engine receiving portions 7*a*, 8*a* of the upper member 7 and the lower member 8 can surely prevent protrusion of the engine 2.

Also, the virtual line L1 connecting the rear end surface of the engine receiving portion 7*a* of the upper member 7 and the rear end surface of the engine receiving portion 8*a* of the lower member 8 extends along a substantially vertical direction. Hence, when the engine 2 is likely to protrude into the arrangement space of the battery unit 10 and the DC-DC converter 11 at the time of a rear-end collision, the engine receiving portions 7*a*, 8*a* of the upper member 7 and the lower member 8 can receive the front end part of the engine 2 almost simultaneously.

Also, the upper member 7 and the lower member 8 respectively include the seat receiving portions 7*b*, 8*b* for receiving the rear part of the seats 3 at the time of a rear-end collision. Hence, when the seats 3 are likely to protrude into the arrangement space of the battery unit 10 and the DC-DC converter 11 at the time of a rear-end collision, the seat receiving portions 7*b*, 8*b* of the upper member 7 and the lower member 8 can surely prevent protrusion of the seats 3.

Also, the high voltage equipment-protection cover 17 covering the front of the battery unit 10 and the DC-DC converter 11 is fastened to the upper member 7 and the lower member 8. Hence, when the seats 3 move (slide or reclined) with luggage sandwiched between the seats 3 and the high voltage equipment-protection cover 17, load of the seats 3 acting on the high voltage equipment-protection cover 17 through the luggage can be passed to the upper member 7 and the lower member 8. As a result, the high voltage equipment-protection cover 17 protrudes less into the arrangement space of the battery unit 10 and the DC-DC converter 11, so that damage in the battery unit 10 and the DC-DC converter 11 can be prevented.

Note that the present invention is not limited to the embodiment described above, and may be modified or improved, for example, as is appropriate.

For example, while the embodiment uses the battery unit and the DC-DC converter as an example of high voltage equipment to which the present invention is applied, the high voltage equipment to which the present invention is applied may be any one of a battery unit, a DC-DC converter, and an inverter, or a combination of two or more of these devices. Also, the battery does not necessarily have to be unitized.

A vehicle (e.g. the vehicle 1 of the embodiment) in which high voltage equipment (e.g. the battery unit 10 and the DC-DC converter 11 of the embodiment) is arranged behind a seat (e.g. the seats 3 of the embodiment) and in front of an engine (e.g. the engine 2 of the embodiment), includes: an upper member (e.g. the upper member 7 of the embodiment) arranged in an upper part between the seat and the engine, and extending in the vehicle width direction; and a lower member (e.g. the lower member 8 of the embodiment) arranged in a lower part between the seat and the engine, and extending in the vehicle width direction. The high voltage equipment is arranged in a space (e.g. the high voltage equipment-accommodation portion 13 of the embodiment) surrounded by the upper member and the lower member.

The upper member and the lower member respectively include engine receiving portions (e.g. the engine receiving portions 7*a*, 8*a* of the embodiment) for receiving a front end part of the engine at the time of a rear-end collision.

A virtual line (e.g. the virtual line L1 of the embodiment) connecting a rear end surface of the engine receiving portion of the upper member and a rear end surface of the engine receiving portion of the lower member extends along a substantially vertical direction.

The upper member and the lower member respectively include seat receiving portions (e.g. the seat receiving portions 7*b*, 8*b* of the embodiment) for receiving a rear part of the seat at the time of a rear-end collision.

The high voltage equipment is accommodated in a high voltage equipment-accommodation portion (e.g. the high voltage equipment-accommodation portion 13 of the embodiment) partitioned between the upper member and the lower member, and is covered with a high voltage equipment-protection cover (e.g. the high voltage equipment-protection cover 17 of the embodiment) covering the high voltage equipment-accommodation portion from the front. The high voltage equipment-protection cover is fastened to the upper member and the lower member.

[Effect]

Even though the high voltage equipment is arranged behind the seat and in front of the engine, the high voltage equipment is arranged in a space surrounded by the upper member and the lower member. Hence, when the engine and the seat are likely to protrude into the arrangement space of the high voltage equipment at the time of a rear-end collision, the upper and lower members can prevent protrusion of the engine and the seat, and thereby prevent damage in the high voltage equipment.

Also, the upper member and the lower member respectively include the engine receiving portions for receiving the front end part of the engine at the time of a rear-end collision. Hence, when the engine is likely to protrude into the arrangement space of the high voltage equipment at the time of a rear-end collision, the engine receiving portions of the upper member and the lower member can surely prevent protrusion of the engine.

Also, the virtual line connecting the rear end surface of the engine receiving portion of the upper member and the rear end surface of the engine receiving portion of the lower member extends along a substantially vertical direction. Hence, when the engine is likely to protrude into the arrangement space of the high voltage equipment at the time of a rear-end collision, the engine receiving portions of the upper member and the lower member can receive the front end part of the engine almost simultaneously.

Also, the upper member and the lower member respectively include the seat receiving portions for receiving the rear part of the seat at the time of a rear-end collision. Hence, when the seat is likely to protrude into the arrangement space of the high voltage equipment at the time of a rear-end collision, the seat receiving portions of the upper member and the lower member can surely prevent protrusion of the seat.

Also, the high voltage equipment-protection cover covering the front of the high voltage equipment is fastened to the upper member and the lower member. Hence, when the seat moves (slides or reclined) with luggage sandwiched between the seat and the high voltage equipment-protection cover, load of the seat acting on the high voltage equipment-protection cover through the luggage can be passed to the upper member and the lower member. As a result, the high voltage equipment-protection cover protrudes less into the arrangement space of the high voltage equipment, so that damage in the high voltage equipment can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle in which high voltage equipment is arranged behind a seat and in front of an engine, comprising:
    an upper member arranged between said seat and said engine, said upper member extending in a vehicle width direction; and
    a lower member arranged between said seat and said engine, said lower member extending in the vehicle width direction, said lower member being provided at a location lower than said upper member in a vehicle height direction of the vehicle, wherein
    said high voltage equipment is arranged in a space, the space being sandwiched between said upper member provided at an upper end of the space and said lower member provided at a lower end of the space, wherein a position of a bottom of said upper member is lower than a position of a top of said engine in the vehicle height direction, and a position of a top of said lower member is higher than a position of a bottom of said engine in the vehicle height direction.

2. The vehicle according to claim 1, wherein said upper member and said lower member respectively include engine receiving portions for receiving a front end part of said engine at the time of a rear-end collision.

3. The vehicle according to claim 2, wherein a rear end surface of said engine receiving portion of said upper member and a rear end surface of said engine receiving portion of said lower member are aligned along an imaginary line that extends in a vertical direction.

4. The vehicle according to claim 1, wherein said upper member and said lower member respectively include seat receiving portions for receiving a rear part of said seat at the time of a rear-end collision.

5. The vehicle according to claim 1, wherein:
    said high voltage equipment is accommodated in a high voltage equipment-accommodation portion partitioned between said upper member and said lower member, and said high voltage equipment-accommodation portion is covered on a front side with a high voltage equipment-protection cover; and
    said high voltage equipment-protection cover is fastened to said upper member and said lower member.

6. A vehicle comprising:
    an engine provided at a rear in a front-rear direction of the vehicle;
    a seat provided in front of the engine in the front-rear direction;
    an upper member provided between the seat and the engine in the front-rear direction, the upper member extending in a vehicle width direction of the vehicle, the vehicle width direction being perpendicular to the front-rear direction;
    a lower member extending in the vehicle width direction and provided between the seat and the engine, the lower member being provided below the upper member in a vehicle height direction of the vehicle, the vehicle height direction being perpendicular to both the front-rear direction and the vehicle width direction; and
    at least one item of high voltage equipment provided between the seat and the engine and in a space, the space being sandwiched between the upper member provided at an upper end of the space and the lower member provided at a lower end of the space, wherein a position of a bottom of the upper member is lower than a position of a top of the engine in the vehicle height direction, and a position of a top of the lower member is higher than a position of a bottom of the engine in the vehicle height direction.

7. The vehicle according to claim 6, wherein each of the upper member and the lower member includes an engine receiving portion to receive a front end part of the engine upon a rear-end collision.

8. The vehicle according to claim 7, wherein a rear end surface of the engine receiving portion of the upper member and a rear end surface of the engine receiving portion of the lower member are aligned along an imaginary line that extends in a vertical direction.

9. The vehicle according to claim 6, wherein each of the upper member and the lower member includes a seat receiving portion to receive a rear part of the seat upon a rear-end collision.

10. The vehicle according to claim 6, wherein the at least one item of high voltage equipment is accommodated in a high voltage equipment-accommodation portion partitioned between the upper member and the lower member,
    the at least one item of high voltage equipment is covered on a front side with a high voltage equipment-protection cover, and
    the high voltage equipment-protection cover is fastened to the upper member and the lower member.

11. The vehicle according to claim 6, wherein the upper member and the lower member at least partially overlap when viewed in the vehicle height direction.

12. The vehicle according to claim 6, wherein
each of the upper member, the lower member, and the high voltage equipment at least partially overlap when viewed in the vehicle height direction.
13. The vehicle according to claim 1, wherein
said upper member and said lower member at least partially overlap when viewed in the vehicle height direction.
14. The vehicle according to claim 1, wherein
each of said upper member, said lower member, and said high voltage equipment at least partially overlap when viewed in the vehicle height direction.

\* \* \* \* \*